A. RIEBE.
BALL BEARING.
APPLICATION FILED JULY 30, 1907.
955,286.
Patented Apr. 19, 1910.
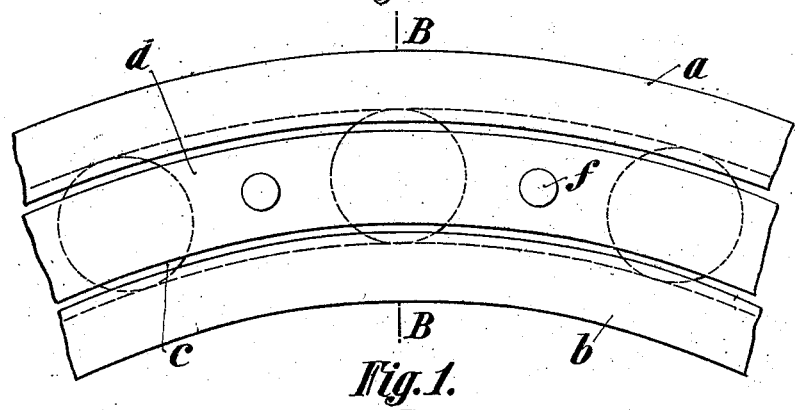
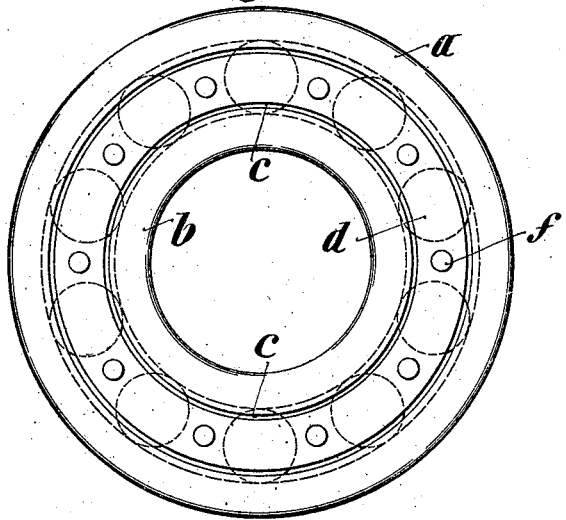
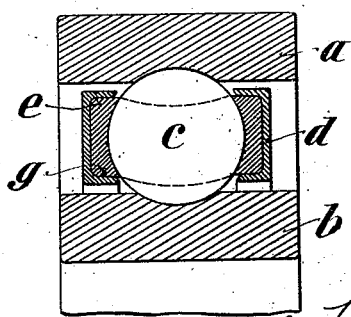
WITNESSES:
Fred White
Rene Bruine
INVENTOR:
August Riebe,
By his Attorneys

UNITED STATES PATENT OFFICE.

AUGUST RIEBE, OF BERLIN, GERMANY, ASSIGNOR TO THE HESS-BRIGHT MANUFACTURING COMPANY, A CORPORATION OF NEW JERSEY.

BALL-BEARING.

955,286.  Specification of Letters Patent.  Patented Apr. 19, 1910.

Application filed July 30, 1907. Serial No. 386,209.

*To all whom it may concern:*

Be it known that I, AUGUST RIEBE, a subject of the King of Prussia, residing at 34 and 35 Huttenstrasse, Berlin, in the Kingdom of Prussia, Germany, have invented certain new and useful Improvements in Ball-Bearings, of which the following is a full, clear, and exact description.

The invention relates to a ball bearing of that class in which the balls are arranged between two concentric rings provided with grooves, said balls being maintained at a certain distance from each other by means of an annular movable cage. In ball bearings of this character as heretofore constructed, the cage is made entirely of sheet metal such as iron plate or other comparatively hard metal. Thus when these bearings are working there results considerable noise, friction and wear, which circumstances have led to the cage being constructed of soft metal, such for example as an anti-friction metal, alloy or the like, thereby lessening the friction and noise. If the cage is constructed entirely of soft metal then in order to obtain the necessary strength it must be made of considerable thickness, thereby of course increasing the weight and cost and decreasing the durability of the cage. Furthermore if the cage becomes so heated that the soft metal loses its shape or is melted, the cage is completely spoiled, the balls no longer retain their proper position and the practical and proper working of the bearing ceases.

In order to avoid these disadvantages the present invention consists in constructing a composite cage consisting of the combination of a solid and light armor or case of hard metal and a lining of soft anti-friction metal or other soft material such as leather, fiber or the like, that is, of such materials as contribute to reduce the noise and friction. By reason of this combination the cage is relatively speaking light and the balls turn in their cage without noise and with very slight friction while if the cage becomes heated so that the lining is softened or melted then the hard metal casing or armoring is capable of maintaining the balls at a suitable distance from each other thus permitting the bearing to continue to work properly until another lining is substituted.

The invention will now be described with reference to the accompanying drawings in which—

Figure 1 is a side elevation of a complete bearing, Fig. 2 is a side elevation of a portion of the bearing drawn to an enlarged scale, Fig. 3 is a cross section on the lines B—B of Fig. 2.

Like parts are indicated by similar letters of reference in the several figures.

*a* and *b* represent the outer and inner rings of the bearing, *c* represents the balls working in the circular track or race of these rings, *d* represents an armoring or casing made of sheet metal such as iron plate or other comparatively hard material and *e* is an inner lining of anti-friction metal which is held in this armoring or casing by any suitable means and incloses the balls.

The armoring or casing shown consists of two annular oppositely situated parts *d* which are connected together by rivets *f* or other fixed or removable fixing means and in each of these parts grooves or recesses *g* are formed by stamping or otherwise and serve to receive the lining *e*. The lining *e* is formed by pouring metal into the hollow space of the armoring or casing *d* after having inserted the balls and by the aid of a suitable mold or it may be effected in any other suitable manner. Should the bearing become heated and the lining *e* be burned out or melted the balls will be still separated from each other by the rivets *f*. The bearing will hence remain in working condition whether the lining is in place or not, although its efficiency may not be as great as though the lining were intact. In place of the rivets any other suitable means for separating the balls may be employed.

Instead of antifriction metal an inner lining *e* of fiber or other suitable material may be substituted therefor.

It may be remarked that the shape and the method of constructing the armoring or casing *d* and lining *e* may be varied without departing from the principle of the present invention.

What I claim as my invention and desire to secure by patent is:

1. A cage for ball bearings, having between each two adjacent balls two independent means for separating them, one of such means consisting of a relatively soft material extending normally between each two adjacent balls a sufficient distance to hold the balls separated in use, and the other of said means constituting an emergency device adapted to hold the balls separated when the first of said means is worn out or melted.

2. A cage for ball bearings, having between each two adjacent balls two independent means for separating them, one of such means consisting of soft metal extending normally between each two adjacent balls a sufficient distance to hold the balls separated in use, and the other of said means constituting an emergency device adapted to hold the balls separated when the first of said means is worn or melted, and comprising hard metal members of proper proportions to separate the balls.

3. A cage for ball bearings, having between each two adjacent balls two independent means for separating them, one of such means consisting of soft metal extending normally between each two adjacent balls a sufficient distance to hold the balls separated in use, and the other of said means constituting an emergency device adapted to hold the balls separated when the first of said means is worn or melted, and comprising hard metal members of proper proportions to separate the balls, and an annular casing of hard metal supporting both said means.

4. A cage for ball bearings, having an annular casing of hard metal, and a lining of softer material supported upon said casing, said lining extending between the balls to a sufficient extent to keep them separated in use.

5. A cage for ball bearings, having an annular casing of hard metal and a lining of softer metal supported upon said casing, said lining extending between the balls to a sufficient extent to keep them separated in use.

6. A cage for ball bearings, having an internally grooved annular casing of hard metal and a lining of softer material supported within said grooves, said lining extending between the balls and keeping the latter separated in use.

7. A cage for ball bearings, having an annular casing and an annular lining, the lining normally constituting the means for separating the balls, and having a recess for each ball, and between such recesses portions extending between each two adjacent balls.

8. A cage for ball bearings, having an annular casing of hard metal, and having an annular soft metal lining formed as a single part and having a recess for each ball and portions between said recesses for separating each two adjacent balls.

9. A cage for ball bearings, having an annular casing of hard metal, and having an annular soft metal lining formed as a single part, and having a recess for each ball and portions between said recesses for separating each two adjacent balls, and hard metal parts extending between each two adjacent balls and designed to separate the balls after said lining is worn or melted.

In witness whereof, I have hereunto signed my name in the presence of two subscribing witnesses.

AUGUST RIEBE.

Witnesses:
  HENRY HASPER,
  WOLDEMAR HAUPT.